US007416484B1

(12) United States Patent
Nelson et al.

(10) Patent No.: US 7,416,484 B1
(45) Date of Patent: Aug. 26, 2008

(54) SIMULATED BONUS METHOD IN FINITE-POOL AWARD SYSTEM

(75) Inventors: Loren Travis Nelson, Reno, NV (US); Michael Delaney, Truckee, CA (US); Robert Anthony Luciano, Jr., Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 113 days.

(21) Appl. No.: 10/158,744

(22) Filed: May 29, 2002

Related U.S. Application Data

(63) Continuation-in-part of application No. 09/450,821, filed on Nov. 29, 1999, now Pat. No. 6,537,150.

(51) Int. Cl.

| | |
|---|---|
| ***G06F 17/00*** | (2006.01) |
| ***G06F 19/00*** | (2006.01) |
| ***A63F 9/24*** | (2006.01) |
| ***A63F 13/00*** | (2006.01) |

(52) U.S. Cl. ............................ 463/25; 463/16; 463/20; 463/26; 273/138.1; 273/143 R

(58) Field of Classification Search ............ 463/16–21, 463/25–28, 40–43, 46, 9–13, 22; 273/138.1, 273/138.2, 139, 143 R, 269, 237, 292; 283/903, 283/49, 51; 379/93.13; 434/128
See application file for complete search history.

(56) References Cited

U.S. PATENT DOCUMENTS

| | | | | |
|---|---|---|---|---|
| 4,652,998 | A * | 3/1987 | Koza et al. | 463/26 |
| 4,982,337 | A * | 1/1991 | Burr et al. | 700/235 |
| 5,046,737 | A | 9/1991 | Fienberg | |
| 5,290,033 | A | 3/1994 | Bittner | |
| 5,324,035 | A * | 6/1994 | Morris et al. | 463/42 |
| 5,348,299 | A | 9/1994 | Clapper | |
| 5,494,287 | A * | 2/1996 | Manz | 273/143 R |
| 5,595,538 | A * | 1/1997 | Haste, III | 463/17 |
| 5,611,729 | A * | 3/1997 | Schumacher et al. | 463/18 |
| 5,628,684 | A * | 5/1997 | Bouedec | 463/17 |
| 5,810,664 | A * | 9/1998 | Clapper, Jr. | 463/17 |
| 5,855,514 | A * | 1/1999 | Kamille | 463/17 |
| 5,871,398 | A * | 2/1999 | Schneier et al. | 463/16 |
| 5,931,467 | A * | 8/1999 | Kamille | 273/139 |
| 5,944,606 | A * | 8/1999 | Gerow | 463/27 |

(Continued)

FOREIGN PATENT DOCUMENTS

| | | | |
|---|---|---|---|
| GB | 2128486 | A * | 5/1984 |

*Primary Examiner*—Robert E Pezzuto
*Assistant Examiner*—Milap Shah
(74) *Attorney, Agent, or Firm*—Jonathan T. Velasco; Brooke W. Quist; J P Cody

(57) ABSTRACT

A method for simulating bonus awards in a finite award pool system is disclosed. The finite award pool comprises a plurality of primary awards and at least one simulated bonus award, where at least one of the primary awards indicate further entitlement to one of the simulated bonus awards. The simulated bonus awards may not be selected as a primary award per se, but constitute a portion of the actual primary award when combined with the primary award associated therewith. Additionally, the present arrangement allows simulation of more complex bonus award in finite pool systems by providing multiple or nested bonus level selections from either primary prizes or bonus prizes.

8 Claims, 4 Drawing Sheets

U.S. PATENT DOCUMENTS

| | | | | |
|---|---|---|---|---|
| 5,980,385 | A * | 11/1999 | Clapper, Jr. | 463/17 |
| 5,996,997 | A * | 12/1999 | Kamille | 273/139 |
| 6,009,458 | A * | 12/1999 | Hawkins et al. | 709/203 |
| 6,024,640 | A * | 2/2000 | Walker et al. | 463/17 |
| 6,113,492 | A * | 9/2000 | Walker et al. | 463/16 |
| 6,220,961 | B1 * | 4/2001 | Keane et al. | 463/16 |
| 6,224,484 | B1 * | 5/2001 | Okuda et al. | 463/27 |
| 6,237,913 | B1 * | 5/2001 | Kamille | 273/139 |
| 6,309,298 | B1 * | 10/2001 | Gerow | 463/20 |
| 6,358,149 | B1 | 3/2002 | Schneider | |
| 6,537,150 | B1 * | 3/2003 | Luciano et al. | 463/16 |
| 6,588,747 | B1 * | 7/2003 | Seelig | 273/138.1 |
| 6,672,959 | B2 * | 1/2004 | Moody et al. | 463/13 |
| 6,733,385 | B1 * | 5/2004 | Enzminger et al. | 463/17 |
| 6,745,236 | B1 * | 6/2004 | Hawkins et al. | 709/218 |
| 6,749,500 | B1 * | 6/2004 | Nelson et al. | 463/13 |
| 6,780,108 | B1 * | 8/2004 | Luciano et al. | 463/19 |

* cited by examiner

SIMULATED BONUS METHOD IN FINITE-POOL AWARD SYSTEM

RELATED APPLICATION

This application is a continuation in part application of U.S. patent application Ser. No. 09/450,821, filed Nov. 29, 1999, entitled "Lottery System Having Reverse-Mapped Game Set," now U.S. Pat. No. 6,537,150 the disclosure of which is incorporated herein by reference in entirety.

BACKGROUND OF THE INVENTION

1. Field of the Invention

This invention pertains generally to finite pool bonus awards. More particularly, the invention relates to a method and system for providing simulated bonus awards in a finite pool award arrangement.

2. The Prior Art

Finite pool award systems are known in the field of gaming and lottery. Unlike random-based games such as slot machines, for example, wherein the outcome of the game is based primarily on random events, finite pool awards (or fixed-pool awards) are based primarily on a draw from a finite distribution of outcomes or results.

Common forms of finite pool games include pull-tab and scratch-off lottery tickets. These tickets are arranged into finite sets called "deals," "decks" or "draws". Each finite set has a predetermined number of tickets at various prize levels. Therefore the total price of the deck is known (since the tickets are sold for a uniform amount) and the total value of the prizes is known, so the seller of the tickets knows the total profit to be made on the sale of the deck. These decks of tickets are manufactured and printed at a central location, and put into a form usable by standard dispensing machines, typically in rolls or stacks. These rolls are then physically distributed from the central location to each vending site for dispensing. Tickets are dispensed by clerks or vending machines to customers, who peel open a layer hiding the prize contents to reveal what their winning value is, if any. Winning tickets are redeemable for the value of the win. Examples of such implementations are described in U.S. Pat. Nos. 5,290,033 entitled "GAMING MACHINE AND COUPONS" to Bittner, et al. and 5,348,299 entitled "ELECTRONIC GAMING APPARATUS" to Clapper, Jr.

In addition to the paper version of pull-tab games described above, electronic versions of pull-tab games have also been implemented. Under this electronic arrangement, the finite sets ("decks") are generated electronically and stored on a central server. One or more player terminals are then networked to the central server. Players, who wish to play a pull-tab game under this arrangement, may purchase, reveal, and redeem the electronic pull-tabs from the player terminals. When a player at a player terminal makes a purchase, an electronic pull-tab or "game element" is communicated from the server to the player terminal. The electronic pull-tab is displayed to the player on the player terminal and is removed from the "deck" by the central server to indicate that the pull-tab has been played. The presentation of the pull-tab to the player may be provided in various forms (such as poker hands, slot symbols, keno symbols, etc.) to mimic the presentation of other games of chance (e.g., random-based games, such as video poker, slot machines, video keno, etc.) although in reality the game is that of a finite pool award, namely pull-tab games.

Various arrangements have been further developed to further increase player participation in electronic forms of finite pool award games. One such technique is generally referred to as "reverse-mapping" and is described in copending U.S. Application "Lottery System Having Reverse-Mapped Game Set" Ser. No. 09/450,821, the disclosure of which is expressly incorporated herein by reference in entirety. Unlike prior art lottery systems which provide both the outcome symbols and the win amount to the player terminal for each pull-tab game drawn from the central server, the reverse-mapping method only provides the win amount; the player terminal, after receiving the win amount, is then able to generate the outcome symbols from the win amount; the outcome symbols are then presented to the player. This arrangement provides the advantage of allowing the player terminals to generate one of a plurality of game outcomes symbols to the player, thereby increasing game diversity and player appeal. This arrangement also allows different game formats on player terminals to share the same finite prize pool maintained on a single server.

Another disadvantage of systems of the prior art results from legal restrictions on "bonus" awards. Some jurisdictions effectively limit the use of bonus or secondary event awards, by requiring that such awards not be counted in determining the net payout of a gaming device. These rules tend to limit the flexibility available to the designer of a game. The reverse-mapped system of copending U.S. Application entitled "Lottery System Having Reverse-Mapped Game Set" Ser. No. 09/450,821 describes an approach with provides more flexibility, and can be more easily tailored to comply with local regulations while still providing a varied and entertaining game, through the use of bonus and secondary event simulations that are reverse-mapped from pre-determined award outcomes. The payouts to the player are not true "bonus" awards but only simulated bonus awards using a single draw for the finite pool. Under this arrangement, the central server provides pre-determined award outcomes (game elements) which may indicate that a portion of the award is to be paid as a "bonus" simulation. If the selected game set element is coded or is otherwise determined to be applied as a bonus award, a portion of the winnings may be paid to the player in the form of a bonus award, rather than as part of the primary base pay. Each portion (base pay and secondary pay) can then be reversed-mapped by the player terminal to provide a symbolic display for each pay (e.g., a slot display for the base pay and a secondary game screen for the secondary pay). For example, a predetermined award amount of $1000 can be paid to the player either through a base pay of $1000 (no bonus pay) or a base pay of $100 plus a secondary bonus pay of $900.

Unfortunately, as games of chance (e.g., slot machines) have become more complex including numerous payline arrangements and multiple bonus levels, the number of possible win combinations (base pay+bonus win) has likewise grown. Simulating these complex games on a finite pool award system becomes unpractical (e.g., memory, processor, and other limitations) due to the increased number of win combinations that need to be represented in a finite pool. With the limited memory and processing power of the lottery player terminals, complex paylines and bonus levels could not be practically represented using the reverse-mapping technique described above.

BRIEF DESCRIPTION OF THE INVENTION

In order to overcome these and other deficiencies in the prior art, disclosed herein is a system and method for providing simulated bonus awards in a finite pool award system using a multiple draw arrangement.

The finite pool award system of the present invention generally comprises a central game server in operable communication with a plurality of player terminals, which are played by players. One example of a finite pool award system is a lottery game having a finite pool of awards, each award represented by a game set element. Each game set element is coded for a particular or primary award, and/or for a bonus award, so the choice of the game set element determines what award can be won by the player. However, unlike prior art methods, a game set element coded as "bonus award" involves one or more draws from bonus finite award pool.

The central server handles communication of both ordinary win game set elements as well as bonus coded game set elements. In the case of an ordinary win (i.e., no bonus award), the central server communicates the primary award amount for that game set element to the player terminal. The player terminal upon receipt of the message from the central server reverse maps the primary award amount into appropriate symbols which is displayed to the user. The corresponding primary award is also paid to the player.

In the case of a bonus-coded game set element, the central server communicates the primary award amount for that game along with (1) an indication that one or more bonus awards are to be paid out and (2) the corresponding bonus award(s) that are to be paid out. The player terminal upon receipt of the message from the central server reverse maps the primary award amount into appropriate symbols which are displayed to the user (including triggering the bonus event). The corresponding primary award is also paid to the player. During the bonus phase of the game, the player terminal reverse-maps each of the bonus award amounts into appropriate symbols which are displayed to the user. The corresponding bonus award(s) are also paid to the player.

This arrangement provides the advantage of mapping the primary award and bonus awards into discrete payouts which are reverse-mapped by the player terminal into appropriate symbols, thereby reducing the processing overhead required by player terminals to determine the primary and bonus amounts which are to paid to the player. Accordingly, complex primary and bonus strategies may now be implemented in finite pool systems otherwise previously impractical and costly. Additionally, this arrangement permits the simulation of more complex "slot type" games into a fixed-pool system arrangement. Further objects and advantages of the invention will be brought out in the following portions of the specification, wherein the detailed description is for the purpose of fully disclosing the preferred embodiment of the invention without placing limitations thereon.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figure 1:
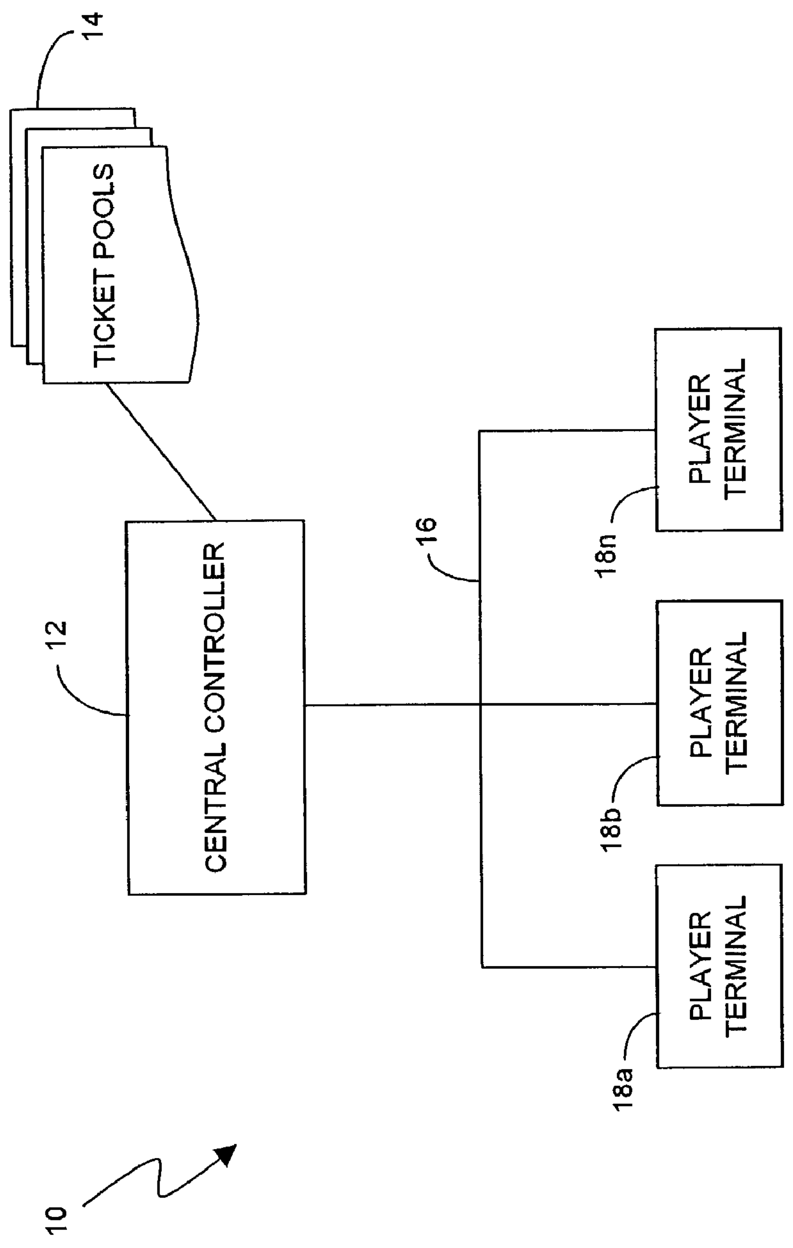
FIG. 1 is a functional block diagram depicting an example finite pool system suitable for use with the present invention.

Persons of ordinary skill in the art will realize that the following description of the present invention is illustrative only and not in any way limiting. Other embodiments of the invention will readily suggest themselves to such skilled persons having the benefit of this disclosure.

It will be advantageous to first describe the simulated bonus arrangements in accordance with prior implementations in order to more clearly point out the advantages of the present invention. One example prior arrangement is described in copending U.S. Application entitled "Lottery System Having Reverse-Mapped Game Set" Ser. No. 09/450,821. To illustrates the prior arrangement, consider Table 1.

TABLE 1

| Award | Number of Elements |
|---|---|
| 25 | 2 |
| 10 | 5 |
| 5 | 10 |
| 3 | 25 |
| 0 | 186 |

Table 1 represents the finite pool of elements in the game set. In practice, a game set element physically comprises an element of data, stored in a computer memory, which element identifies the award associated with that element. For example, the computer can store a plurality of game set elements as an array, each element of the array identifying a monetary value. The array defines the desired probability distribution according to the number of elements having a particular value.

In the simplified example of Table 1, there are two elements associated with an award of 25, five elements associated with an award of 10, and so on. In this example, there are five separate prize levels: 0, 3, 5, 10, and 25, each level representing a particular primary award. In operation, the central server randomly selects a game set element from the finite pool. Each such element is coded so that it is associated with a particular award corresponding to the prize levels. The player terminal must then translate, or reverse-map, that award into an appropriate symbol display and payout the award. The chosen game set element is then removed from the pool.

In order to introduce a simulated bonus award, a substantial increase in the amount of prize levels would likewise be required. For example, introducing example bonus awards of 5, 10, 15 would result in a modified finite-prize table according to Table 2.

TABLE 2

| Award |
|---|
| 25 + 15 = 40 |
| 25 + 10 = 35 |

TABLE 2-continued

| Award |
|---|
| 25 + 5 = 30 |
| 25 |
| 10 + 15 = 25 |
| 10 + 10 = 20 |
| 10 + 5 = 15 |
| 10 |
| 5 + 15 = 20 |
| 5 + 10 = 15 |
| 5 + 5 = 10 |
| 5 |
| 3 + 15 = 18 |
| 3 + 10 = 13 |
| 3 + 5 = 8 |
| 3 |
| 0 |

By introducing three bonus awards (e.g., 5, 10, 15), the total number of prize levels increases to thirteen (13). An associated number of elements for each prize level can be defined in accordance with local rules and to desired profitability. Increasing the number of prize levels requires a corresponding increase in processing power at the player terminal in order to handle several aspects of reverse-mapping, including determining the primary award amount, determining the bonus award amount (if any), reverse mapping each of the primary and bonus award amounts to appropriate symbols, and other processes. As would be readily apparent to one skilled in the art, as the number primary and bonus awards increases, the number of prize levels increase and thus the corresponding processing power in the player terminal required grows to unpractical levels.

In accordance with the present invention, a finite pool award table is provided including primary award levels and one or more bonus award levels which are referenced from the primary award levels. An example finite pool award table in accordance with the present invention is presented in Table 3.

TABLE 3

| Prize Level | Award |
|---|---|
| 1 | 25 |
| 2 | 25 + B (100-120) |
| 3 | 10 |
| 4 | 10 + B (100-120) |
| 5 | 5 |
| 6 | 5 + B (100-120) |
| 7 | 3 |
| 8 | 3 + B (100-110) |
| 9 | 0 |
| 100 | 5 |
| 110 | 10 |
| 120 | 15 |

In the example of Table 3, primary award levels comprise levels 1 through 9, while bonus award levels comprise levels 100 through 120. The appropriate number of elements for each of the primary award levels can be defined in accordance with local rules and to desired profitability. Similarly, number of elements for each of the bonus award levels can be defined in accordance with local rules and to desired profitability. It is noted that bonus awards levels 100 through 120 may not be awarded as a base or primary award, but may only be awarded as a bonus or secondary award in conjunction with a primary award. Bonus levels 100 through 120 are not "true" bonuses but rather "simulated" bonus and therefore constitutes a portion of the "primary" award; however, the presentation of the bonus levels awards appears to the player to be bonus prizes because a presentation separate from the "primary award" is provided in accordance with the invention. It is noted that these simulated bonus should be distinguished from "probability" bonuses which are awarded as part of "scratch off" or "pull tab" lottery games, where the bonus award there is a "true" bonus but awarded on a probability basis. Such bonus strategies would be impermissible in certain jurisdictions where the present invention utilizing "simulated bonuses" would be allowable.

Returning to example Table 3, Primary award levels 1, 3, 5, 7, and 9 include only a base or primary award. Primary award levels 2, 4, 6, and 8 include a base/primary award and a bonus award, as indicated in Table 3. For example, prize level 6 would include a base prize of five (5) plus a bonus prize from bonus prize levels 100 through 120. Prize level 8 would include a base prize of three (3) plus a bonus prize from bonus prize levels 100 through 110.

When a player terminal request a game element from the central server, the central server selects a primary element from the primary awards (e.g., 1 through 9). If the selected element also qualifies for a bonus prize (e.g., award level 2, 4, 6 or 8), then a bonus element from the bonus awards (e.g., 100 through 120). The central server would then communicate to the requesting player terminal the primary award and, if any, the bonus award to be paid to the player. Upon receipt of this communication, the player terminal then displays the primary award to the player, and, if any, displays the bonus. Various means for displaying the game output of the game element (including any bonuses) may be used in accordance with the type of game implemented on the player terminal. For example, slot games would represent win outcomes typically with rotating reels and paylines and in accordance with a payout table; poker games would represent win outcomes with cards representing poker hands and in accordance with a payout table. As in known in the art, payout tables indicate the payout corresponding to particular game results (e.g., slot symbols (or poker hands) with corresponding win amounts).

An example system 10 suitable for use with the present invention is shown in block diagram format in FIG. 1. System 10 comprises a central controller 12 in operable communication with a plurality of player terminals 18*a* through 18*n*, normally through a wired or wireless network system 16. The controller 12 managers one or more electronic ticket pools 14 (each pool comprising a plurality of game set elements), the game set elements of which are distributed to player terminals 18*a* through 18*n* in accordance with the present invention. According to some embodiments, the functions carried out by the controller 12 may be carried out by a plurality of devices or a plurality of controllers 12, each managing different ticket pools to thereby spread the processing workload across multiple devices and provide more robust performance of the system 10.

Controller 12 comprises suitable hardware and software components for carrying out the operations described herein. As such, controller 12 generally comprises a processor board including a processor coupled to memory and to an input/output (I/O) interface for communication to I/O devices (e.g., keyboard, controls, display device, network device). The controller 12 further includes operating software as well controller software executed by the processor for carrying out the processes described herein in accordance with the present invention.

Ticket pools 14 are normally generated by a computer or other data processing device and then stored on the central controller 12 for distribution to the player terminals 18*a* through 18*n*, although a controller 12 with sufficient resources (e.g., processing power and memory) may also carry out the process of generating ticket pools 14. In general, the ticket pools 14 are generated from templates (which define the number of award levels whether primary or bonus and the number of awards in each award level) into "deals" having a plurality of game set elements. As described above, the present invention provides for primary award levels, and at least one bonus award level, where at least one of the primary award levels includes one bonus award from the bonus award level(s). The "actual" award to the player for any given draw includes the primary award plus any bonus awards, if any, although when displayed to the player, the primary award is provided pursuant to primary game display and any bonus awards are simulated pursuant to a secondary game.

The player terminals 18*a* through 18*n* comprise suitable hardware and software components for carrying out the operations described herein. As such, a suitable player terminal generally comprises a processor board including a processor coupled to memory and to an input/output (I/O) interface for communication to I/O devices (e.g., bill validation unit/coin acceptor, player controls, display device, speakers, network device). Each player terminal further includes operating software as well player terminal software executed by the processor for carrying out the processes described herein in accordance with the present invention.

Figure 2:
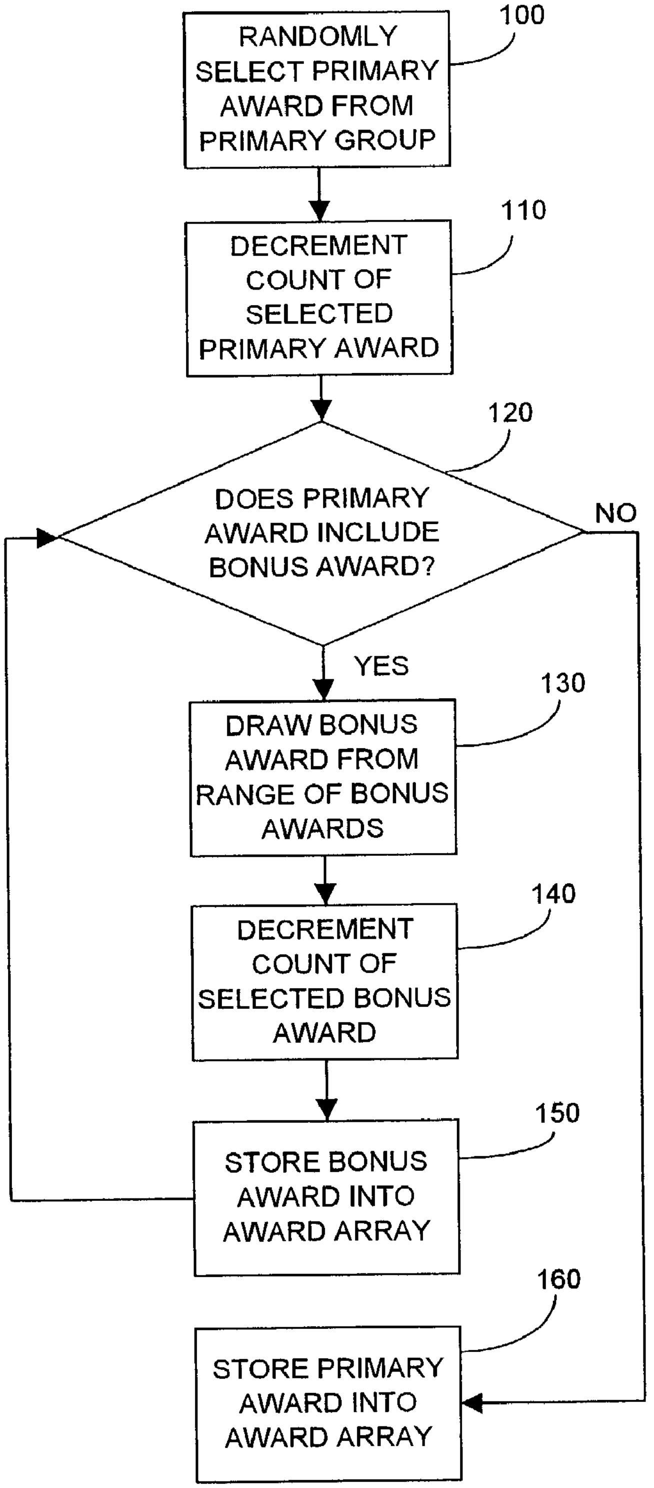
FIG. 2 is a logical flow diagram describing an illustrative process for generating finite ticket pools in accordance with the present.

Referring next to FIG. 2, a logical flow diagram describing an illustrative process for generating finite ticket pools 14 in accordance with the present invention is shown. This process may be carried out by a computer or other data processing device, such as the central control, for example. In general, the process of generating a finite ticket pool 14 (i.e., finite deal) comprises instantiating all the awards from a template into a ticket pool, which may further be subdivided into subsets or "deals." As described above, a template defines the primary and secondary (or bonus) award levels, as well as the number of prizes within each award level. As illustrated in the example Table 3 above, each prize level is associated with a primary prize amount and may further include one or more bonus awards. Each award level will also identify the number of awards for that particular award level. The process described in blocks 100 through 160 is only illustrative, and other means for generating finite ticket pools will be readily apparent to those skilled in the art having the benefit of this disclosure and are contemplated for use with the present invention.

At block 100, a primary award from the primary award group (i.e., an award from one of the primary award levels) is randomly selected. The selected primary award indicates a primary award (including zero) and may further indicate one or more bonus awards.

Next at block 110, the count of the primary award level from which the primary award is selected (box 100) is decremented. As noted above, each award level is associated with a total number of prizes. A counter may be used to identify the total number of awards remaining for each of the award levels and is decremented each time an award is selected from that award level.

At decision block 120, a determination is made whether the selected primary award (from box 100) includes a bonus award. As described above, certain primary award levels may indicate entitlement to one or more bonus awards, and from which bonus group (defined bonus levels). If the selected primary award includes a bonus award, box 130 is then carried out. Otherwise, box 160 is carried out. In some cases a primary bonus award will further indicated entitlement to yet another bonus award (i.e., nested bonus), in which case, box 130 is carried out to determine the further bonus award. Further nesting of bonus awards may further be defined. As will readily be apparent to one skilled in the art, this arrangement provides means for implemented complex simulated bonus awards not previously available in prior art finite pool schemes.

At block 130, the selected primary award (or selected bonus award) includes a bonus award (or nested bonus award). The primary award (or selected bonus award) will further identify the bonus group from which selection of the bonus (or nested bonus) is made. This bonus group may be one or more bonus levels, or a range of bonus levels from which selection of the bonus award is made. A bonus award is randomly selected from the specified bonus group. The selected bonus will indicate a bonus prize or amount and may further indicate entitlement to additional bonus (i.e., nested bonus)

At block 140, the count of the secondary award level from which the bonus award is selected (box 130) is decremented.

At block 150, the selected bonus award (from box 130) is stored into an award array. This award information will generally include award level, award amount, among other information. Blocks 120 and 150 are then repeated for each bonus award identified either by a primary award or by a "primary" or previous bonus award, until all bonus awards have been drawn.

At block 160, the primary award (from block 100) is stored into the award array. This award information will generally include award level, award amount, among other information, such as the number of bonus awards if any associated with the primary awards. Under this example arrangement, if a primary award does not include a bonus award, the primary award is simply stored into the award array. However, if a primary award does include at least one bonus award, the bonus awards are first stored into the array, and then the primary award is stored after all associated bonus awards have been instantiated. This is only one possible arrangement, but has the advantage of allowing the central controller 12 to ascertain all draw bonus awards, if any, from the award array until a primary award is selected, and then assemble the game set element message for communication to the requesting player terminal.

The process shown in blocks 100 through 160 are then repeated until the template is fully instantiated (all awards have been drawn). The completed award array thus constitutes a complete ticket pool 14 for a given template. Since a fully instantiated ticket pool 14 may include large numbers (perhaps in the millions) of game set elements, the award array can be subdivided into subsets or deals for easier management by the central controller 12. Various templates may be provided for a particular gaming device consistent with the particular payback sought. The tickets pools 14 (or subsets thereof) generated in this manner are then communicated to the central controller 12 for distribution in accordance with the present invention.

Figure 3:
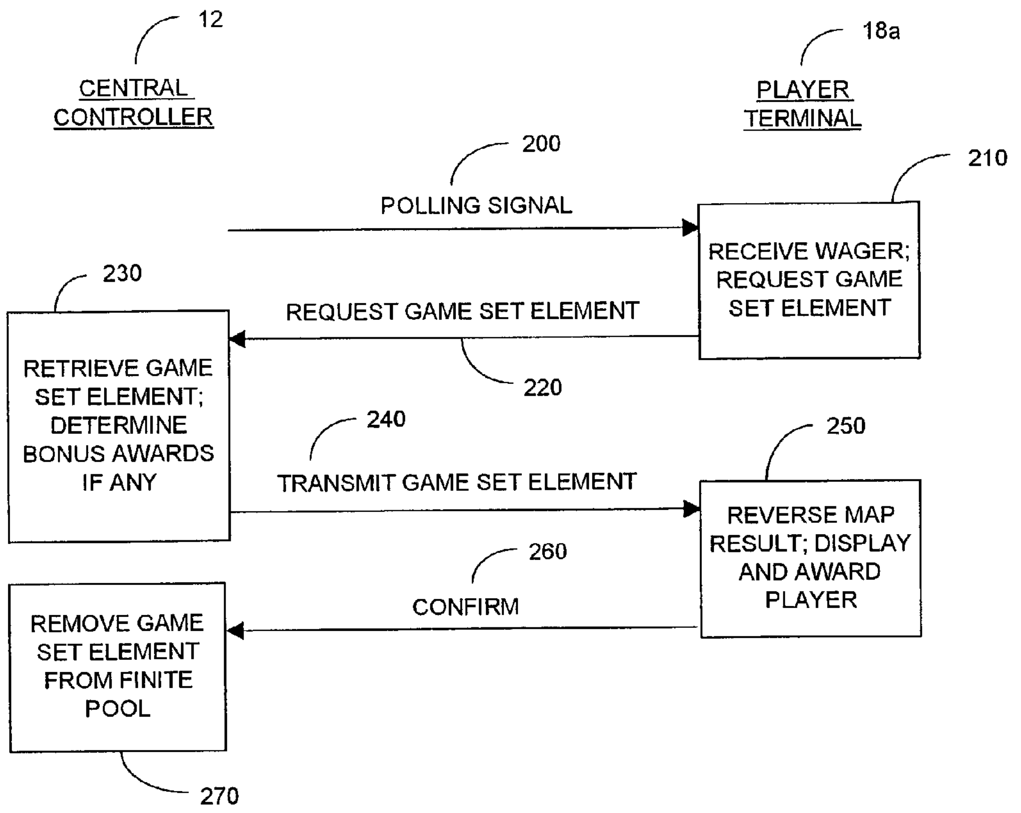
FIG. 3 is a logical flow diagram depicting an example process of distributing game set elements in accordance with the present invention.
Figure 4:
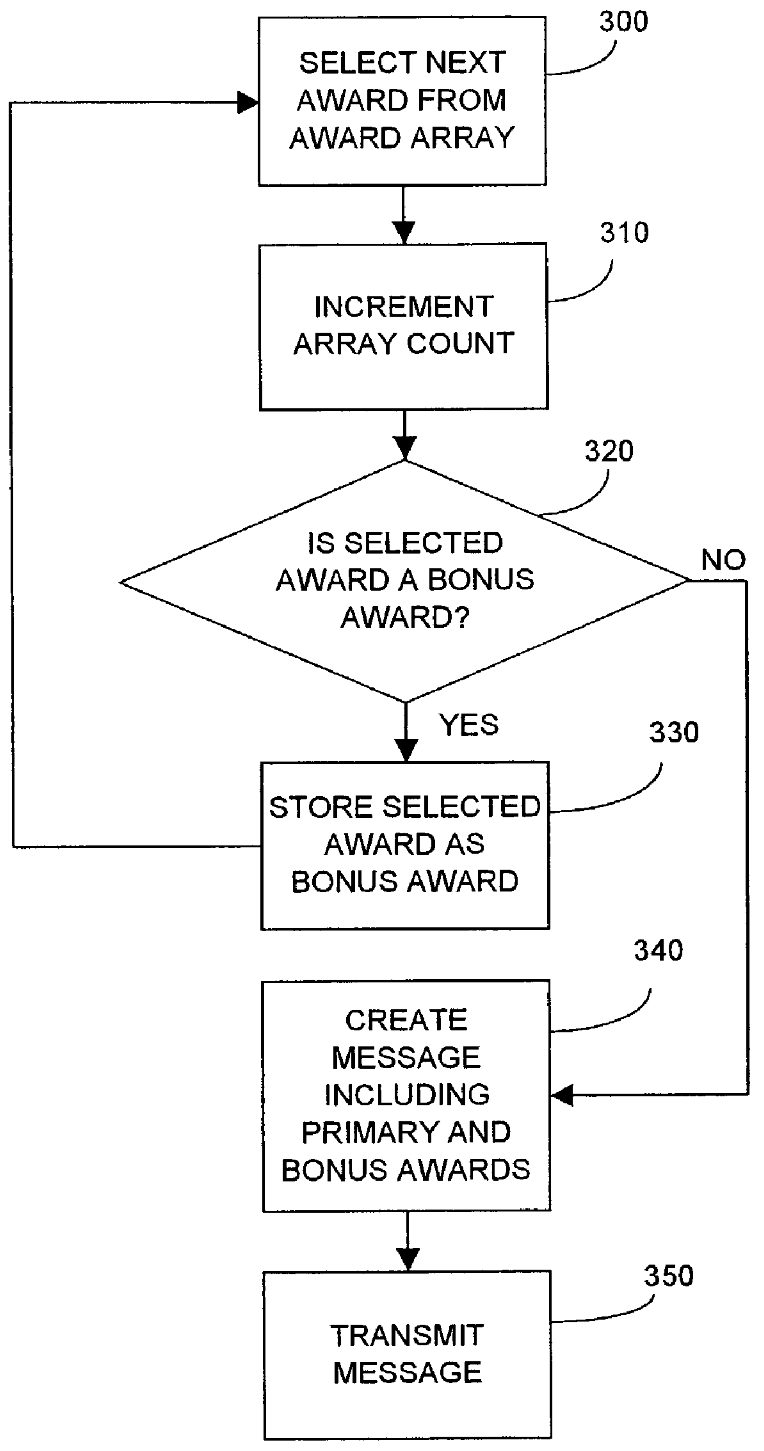
FIG. 4 is a logical flow diagram depicting an example process for selecting a game set element from the award array (or subset or deal) in accordance with the present invention.

Referring now to FIG. 3, a logical flow diagram depicting an example process of distributing game set elements in accordance with the present invention is shown. This process illustrates a sample flow of communication between a player terminal 18*a* and a central controller 12. Reference to FIG. 4 will also be made to describe the process of drawing a game element from the finite ticket pools 14.

Initially, as indicated by communication signal 200, the central controller 12 communicates a polling signal to each of the player terminals 18*a* through 18*n* coupled to the central controller 12. In general, this poll signals is used to indicate that the central controller 12 is ready to receive a request for a game set element.

At block 210, a player terminal 18*a* has received a wager from a player as well as a request to purchase a game set element (normally by pulling a handle or pressing a play button). In response, the player terminal 18*a* awaits a poll signal from the central controller 12 (signal 200) and then transmits a request for game set element, identified as communication signal 220. Based on the game or theme implemented on the player terminal as well as the wager amount, the request will identify an appropriate ticket pool 14 from which the game set element is to be drawn.

At block 230, the central controller 12 receives the request from player terminal 18*a*, and retrieves a game set element from the indicated ticket pool. This process is described in more detail below in conjunction with FIG. 4. The game set element message communicated to the requesting player terminal 18*a* will indicate a primary award, and if any, the number of bonus awards and the amount of each bonus award. As noted above, the bonus awards are merely simulated bonus displays, but the amount for the requested game set element is the total of the primary award and the bonus awards, if any. Unlike probability bonus awards in the prior art, the present awards are true fixed pool awards, where each game set element has a fixed award amount and has a definite payback percentage and value. The representations of the fixed award is merely displayed in a primary award and simulated bonus award manner.

The game set element determined during block 230 is then communicated to the player terminal 18*a* as indicated by communication signal 240. This message is received by the player terminal 18*a* and is processed at block 250. At block 250, the player terminal 18*a* then determines the primary award from signal 240 and reverse maps the primary award amount into a corresponding primary display (e.g., reel symbols, cards symbols, keno symbols, etc.), which is then shown to the user. Any primary award amounts are also paid to the player. If the primary award further includes a simulated bonus award, the primary display shown to user will also trigger play of the secondary or bonus feature. For each bonus award, the bonus amount indicated from signal 240 is reversed mapped into corresponding secondary or bonus displays, each of which are then shown to the user; the corresponding bonus awards are also paid to the player. After the game set element (primary and bonus awards) have been displayed and paid to the player, a confirmation signal 260 is then sent to the central controller 12 to confirm completion of the transaction.

At block 270, the central controller 12 receives the confirmation signal 260 and removes the game set element (selected during block 230) from the finite pool 14. The above process is then repeated until the finite pool 14 is exhausted.

In accordance with one embodiment of the invention, the finite pool 14 is replenished (i.e., a newly instantiated finite pool 14 is provided to the central controller 12) prior to exhaustion so that that game play may continue at the close of the previous finite pool 14. For example, when the present finite pool reaches 50% depletion, a newly instantiated pool may be provided, and the central controller 12 may draw in alternating fashion from each of the pools.

Referring next to FIG. 4, the process for selecting a game set element from the award array (or subset or deal) is generally shown. This process is only illustrative and should not be considered limiting as various other means from drawing game set elements from the award array are contemplated for use with the present invention. The process shown in block 300 through 350 and described below illustrates a suitable solution for the example award array created by the process of FIG. 2 described above.

In general, a counter may be used to determine the current array element in an award array. Those array elements, if any, prior to the current array element have been previously "played" and are considered "removed" in that they cannot be played again.

At block 300, the central controller 12 selects the next award from the award array for a given ticket pool, the next award being the current array element defined by the counter for the ticket pool. The selected award will indicate, among other things, an award level and an award amount.

Next at block 310, the array counter is incremented so that the next array element becomes the current array element.

Next at decision block 320, the central controller determines if the selected award 300 is a bonus award. This determination can be made by comparing the award level of the selected award (from block 300) against the award levels, known to be primary award levels (e.g., award levels less than 100). If the selected award level is a bonus award then block 330 is then carried out. Otherwise, the selected award is a primary award, and block 340 is then carried out.

At block 330, the selected award amount is stored as bonus award and will be assembled into the game set element during block 340 as a bonus award. Blocks 300 through 320 are then repeated, until a primary award is determined at block 320.

At block 340, a primary award from the award array has been selected, and a game set element message is assembled from communication to the player terminal. If no bonus awards are associated with the primary award, a simple message indicating the primary award level and the primary award amount may be sent. Otherwise one or more bonus awards must also be indicated, in which case the game set element message (in addition to indicating the primary award level and the primary award amount) will also identify the number of bonus awards, and for each bonus award: the bonus award level and the bonus award amount.

At block 350, the game set element message is then communicated to the requesting player terminal (depicted in FIG. 3 as communication signal 240).

Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for simulating bonus pay in a finite pool prize system having a central game controller coupled for communication to a plurality of player terminals, said method comprising:

generating a finite pool of at least one primary prize and at least one bonus prize, and wherein each of the at least one bonus prize is a simulated bonus prize, wherein the simulated bonus constitutes a portion of the primary award that appears to a player to be a bonus prize since a separate presentation from the primary award is provided, wherein the simulated bonus is not a probability bonus awarded as part of scratch-off or pull-tab lottery game, and wherein each of the at least one bonus prize is payable only coincident with a primary prize, wherein a wagering cost is associated with each of the at least one primary prize, wherein a payout is associated with each of the at least one primary prize and each of the at least one bonus prize, wherein the finite pool has a predetermined profitability based on a sum of the wagering cost and a sum of the payout;

storing said finite pool on the central game controller;

receiving a purchase request at one of the plurality of player terminals;

receiving a request for a primary prize from said one of the plurality of player terminals;

selecting one of the at least one primary prize in response to said request for a primary prize and removing said one of the at least one primary prize from said finite pool;

selecting the one of the at least one bonus prize if said one of the at least one primary prize identifies entitlement to the one of the at least one bonus prize, and removing said one of the at least one bonus prize from said finite pool if the one of the at least one primary prize identifies entitlement to the one of the at least one bonus prize;

communicating said one of the at least one primary prize to the one of the plurality of player terminals, and if said one of the at least one primary prize indicates entitlement to the one of the at least one bonus prize, then communicating said one of the at least one bonus prize to said one of the plurality of player terminals;

displaying said one of the at least one primary prize on said one of the plurality of player terminals; and displaying said one of the at least one bonus prize on said one of the plurality of player terminals if the one of the at least one bonus prize is received.

2. The method of claim 1, further comprising reverse-mapping said one of the at least one primary prize into displayable game symbols.

3. The method of claim 1, further comprising reverse-mapping said one of the at least one bonus prize into game symbols.

4. A method for distributing simulated bonus awards from a central game controller to a plurality of player terminals, said method comprising:

generating a finite pool of game results, each game result identified either as a primary prize or a bonus prize, wherein the bonus prize is a simulated bonus prize, wherein the simulated bonus constitutes a portion of the primary award that appears to a player to be a bonus prize since a separate presentation from the primary award is provided, wherein the simulated bonus is not a probability bonus awarded as part of scratch-off or pull-tab lottery game, said game results identified as a bonus prize selectable and payable only coincident with a primary prize;

at least one of said game results identified as a primary prize indicating entitlement to at least one game result identified as a bonus prize;

wherein said finite pool has a predetermined profitability based on a wagering cost associated with each primary prize and a sum comprised of payouts associated with each primary prize and bonus prize comprising said finite pool;

receiving a request for a game result from one of the plurality of player terminals;

selecting a primary prize from said finite pool in response to said request and removing said primary prize from said finite pool;

selecting a bonus prize if said primary prize indicates entitlement to the bonus prize and removing said bonus prize from said finite pool; and communicating said primary prize and, if said primary prize indicates entitlement to the bonus prize, said bonus prize to said one of the plurality of player terminals.

5. The method of claim 4, wherein each of said plurality of player terminals is configured to: display said primary prize on said one of the plurality of player terminals; and display said bonus prize on said one of the plurality of player terminals if a bonus prize is received.

6. A method of presenting simulated bonus awards in a finite pool prize system having a central game controller coupled for communication to a plurality of player terminals, said central game controller further including a finite pool of game results, each identified either as a primary prize or a bonus prize, said results identified as a bonus prize selectable only in conjunction with a primary prize, at least one of said results identified as a primary prize further indicating entitlement to at least one result identified as a bonus prize, and further where said finite pool has a predetermined profitability based on a wagering cost associated with each primary game result and a sum comprised of payouts associated with each primary prize result and bonus prize result comprising said finite pool; said method comprising:

receiving a purchase request on one of said player terminals;

requesting a result by said player terminal to said central game controller in response to said purchase request;

receiving a game set element from said central game controller on said player terminal corresponding to said result request, said game set element identifying at least one primary prize result from said the finite pool of game results and removing said primary prize result from the finite pool of game results and, if said primary prize result further indicates entitlement to a bonus prize, a bonus prize result from the finite pool of game results and removing said bonus prize result from the finite pool of game results, wherein the bonus prize is a simulated bonus prize, wherein the simulated bonus constitutes a portion of the primary award that appears to a player to be a bonus prize since a separate presentation from the primary award is provided, wherein the simulated bonus is not a probability bonus awarded as part of scratch-off or pull-tab lottery game;

displaying said primary prize result on said player terminal; and displaying said bonus prize result on said player terminal if a bonus prize result is received in conjunction with said primary prize result.

7. The method of claim 6, further comprising reverse-mapping said primary prize into game symbols.

8. The method of claim 6, further comprising reverse-mapping said bonus prize into game symbols.

* * * * *